(12) United States Patent
Hutchinson et al.

(10) Patent No.: US 7,234,419 B2
(45) Date of Patent: Jun. 26, 2007

(54) ANIMAL GROOMING AID

(76) Inventors: Daniel K. Hutchinson, 2707 Anderson Gibson Rd., Grapevine, TX (US) 76051; Michael S. Hutchinson, 2707 Anderson Gibson Rd., Grapevine, TX (US) 76051

( * ) Notice: Subject to any disclaimer, the term of this patent is extended or adjusted under 35 U.S.C. 154(b) by 0 days.

(21) Appl. No.: 10/913,044

(22) Filed: Aug. 6, 2004

(65) Prior Publication Data

US 2006/0032458 A1    Feb. 16, 2006

(51) Int. Cl.
*A01K 13/00*    (2006.01)
(52) U.S. Cl. .................................... 119/603
(58) Field of Classification Search ............... 119/603, 119/633, 652, 662; 132/112, 113, 114
See application file for complete search history.

(56) References Cited

U.S. PATENT DOCUMENTS

| D165,109 S | 11/1951 | Petrosky |
| 4,254,738 A | 3/1981 | Stanley ........................ 119/83 |
| 4,913,172 A * | 4/1990 | Chou ........................ 132/118 |
| 4,958,596 A * | 9/1990 | Belan ........................ 119/603 |
| 5,348,409 A | 9/1994 | Newman et al. ............... 401/42 |
| 5,365,880 A | 11/1994 | South ........................ 119/85 |
| 5,509,378 A | 4/1996 | Kimura ....................... 119/94 |
| 6,024,052 A * | 2/2000 | Efaw ......................... 119/603 |
| 6,357,450 B1 * | 3/2002 | Paice ......................... 132/114 |
| 6,367,421 B1 * | 4/2002 | Deacon ...................... 119/603 |
| 6,453,848 B1 * | 9/2002 | Hachey ...................... 119/603 |
| 6,637,440 B2 * | 10/2003 | de Laforcade .............. 132/112 |

* cited by examiner

*Primary Examiner*—Thomas Price
(74) *Attorney, Agent, or Firm*—Guy V. Manning

(57) ABSTRACT

A pet grooming aid comprises a flexible, elongate handle coupled to a head bearing rigid tines adapted to reach through a pet's fur to its skin. The handle includes a reservoir for treatment fluids, the reservoir being coupled through a gate valve to a manifold within the head that distributes the fluid to a tube within each tine. Squeezing the handle forces treatment fluid through the manifold and tines onto the pet's skin, while the gate valve prevents fluid flow when the handle is not squeezed. A recharge nozzle and cap on the handle opposite the head allows filling the reservoir without spilling fluid out the tines, and seals the reservoir for use.

19 Claims, 3 Drawing Sheets

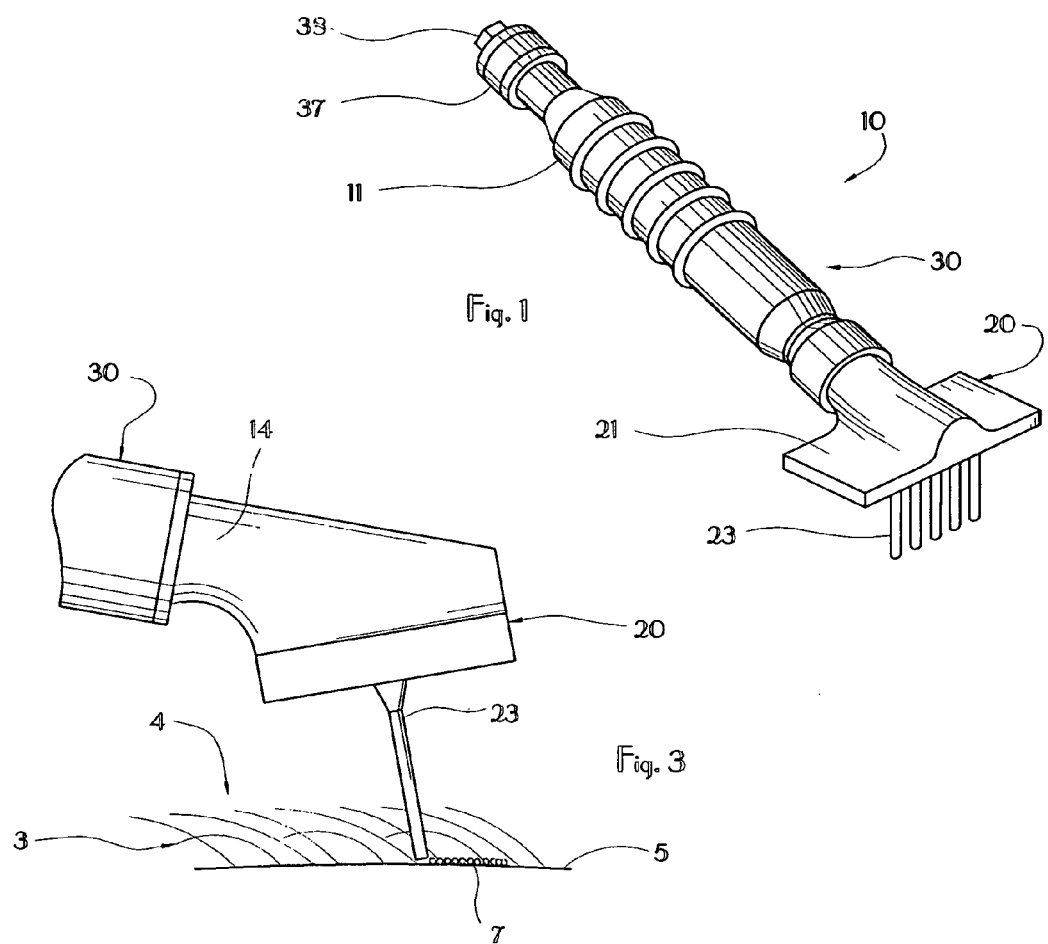
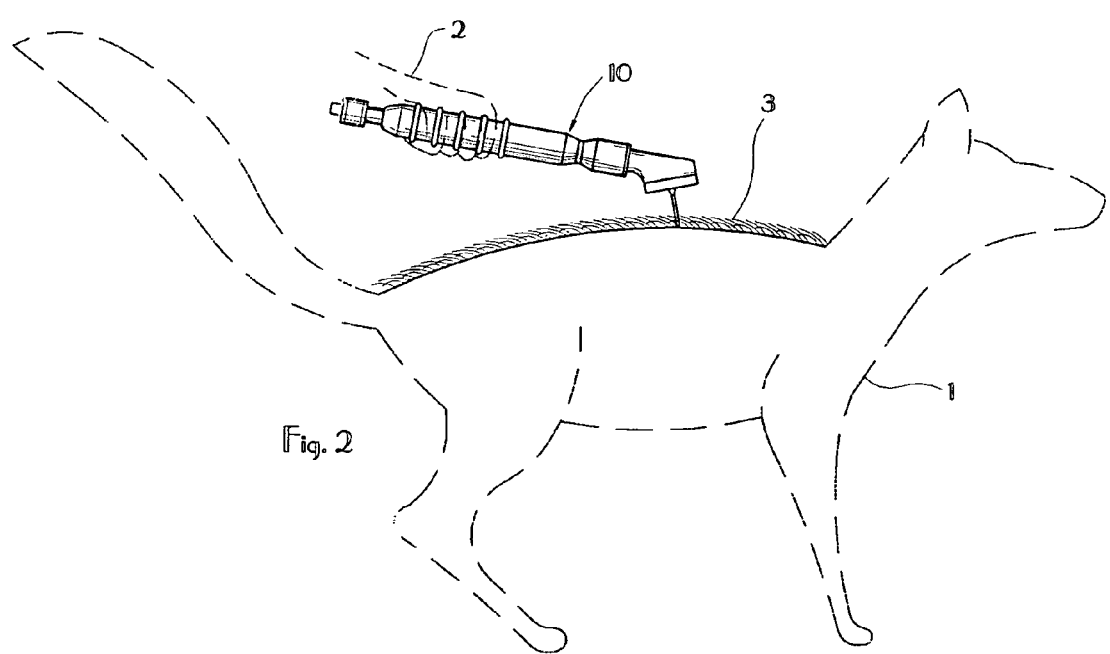

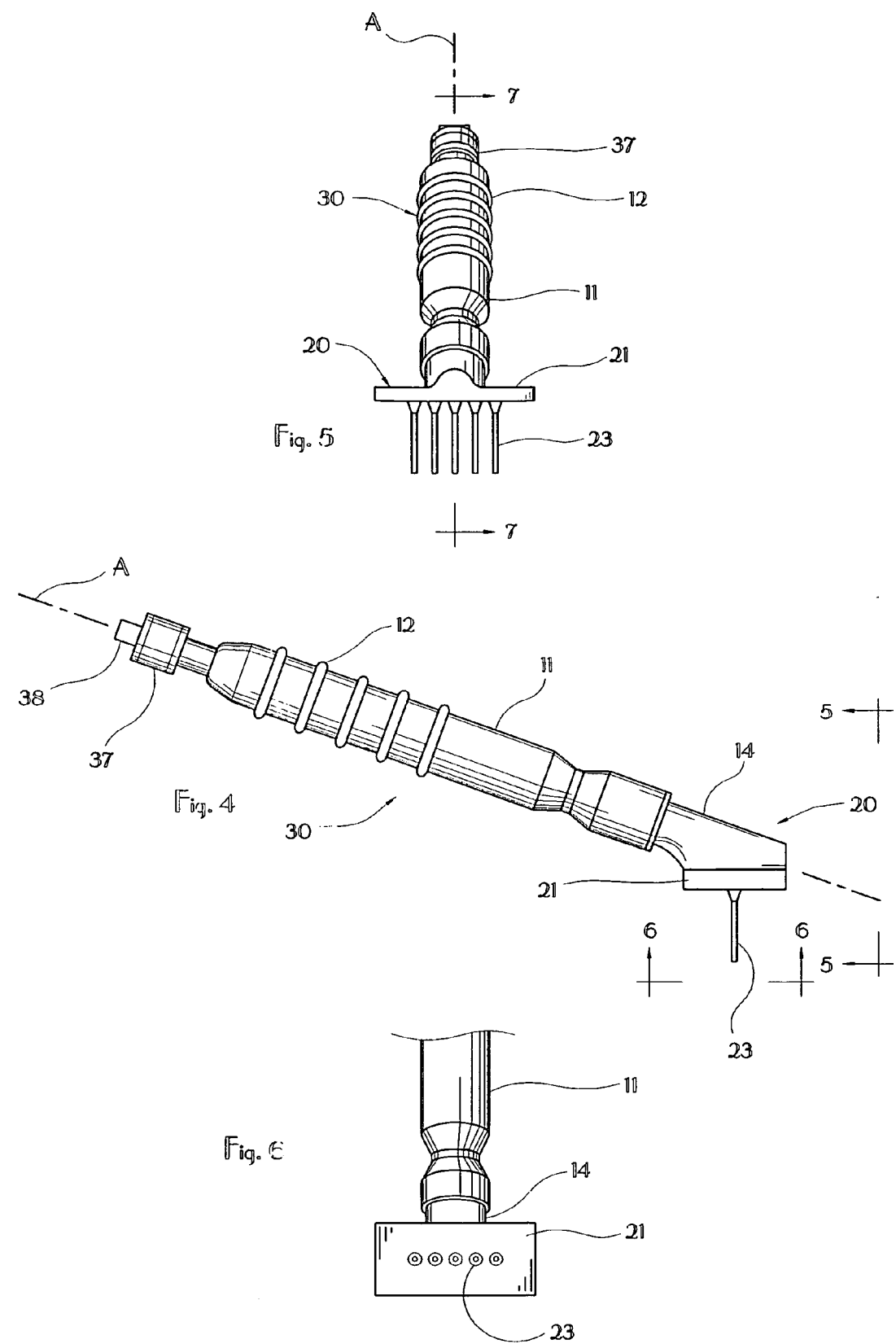

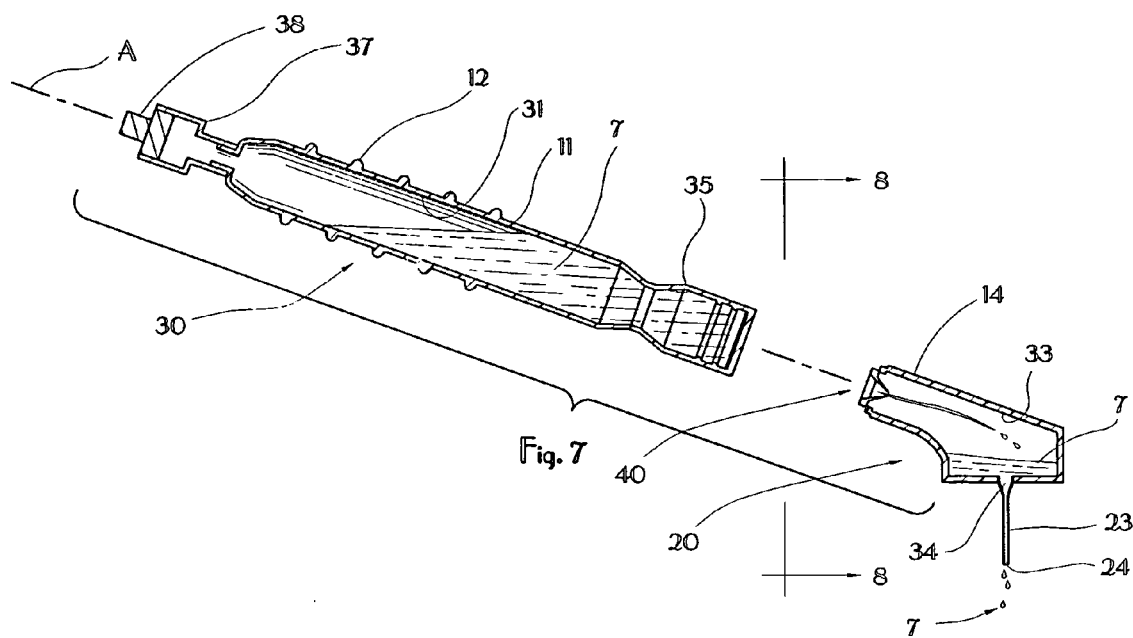
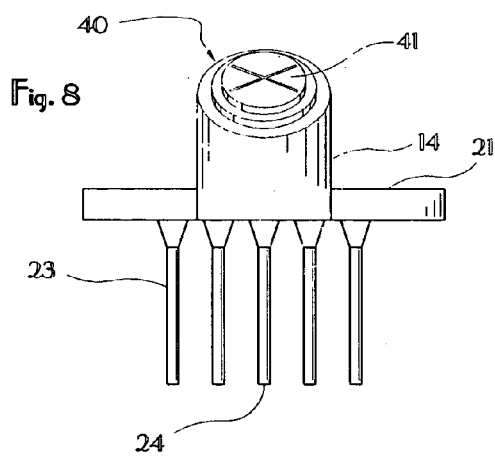
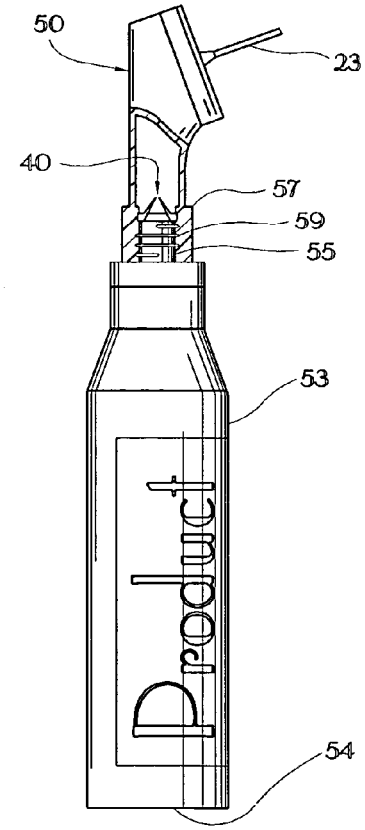

ANIMAL GROOMING AID

BACKGROUND OF THE INVENTION

1. Field of the Invention

This invention relates generally to animal grooming aids and particularly to grooming aids for dispensing treatment or cleaning fluids onto animals. More particularly, this invention relates to a pet combing tool which dispenses fluids through rigid tines that comb through a pet's fur and deliver the fluid directly to the pet's skin.

2. Description of Related Art

Animal grooming involves not only shampooing and trimming, but also periodic pest control such as dipping or dispensing fluids such as flea, tick and other pest treatments. Pest control treatments, typically either powder or liquid, are applied to the pet's skin where they remain until washed or rubbed off. Typical liquid treatment dispensers provide a mist or light stream of fluid which is sprayed onto the surface of the animal's fur. It then must be combed or rubbed through the fur to reach the skin. Substantial portions of the fluid may be left on the fur, risking toxicity to the animal should it lick or gnaw itself after treatment. Means for dispensing treatment fluids directly to a pet's skin while leaving its fur dry would avoid such shortcomings.

Grooming also typically involves brushing and combing a pets's fur to remove debris, excess hair and other foreign materials. Some animals love the combing process while others quickly become agitated or tire of the unfamiliar contact. Even for those pets that enjoy it, many often become restless long before the combing and treatment steps both are finished. Means for combining the treatment and brushing steps would make pet grooming more efficient and enjoyable for both pet and groomer alike.

Many treatment fluid dispensers are simple bottles, with or without dispensing caps. Treatment proceeds by pouring a portion of the treatment fluid onto the pet's fur, setting aside the bottle and proceeding to work the fluid into the fur until it reaches the skin. To the extent that groomer contact with the fluid should be avoided, the groomer must either wear gloves or use a brush or comb to spread the fluid. Between the steps of dispensing the fluid and rubbing it in, substantial portions may run off and be wasted. Means for conserving fluids by dispensing it directly to an animal's skin, especially where the dispensing means itself includes a fluid reservoir, would increase safety and efficiency.

SUMMARY OF THE INVENTION

Accordingly, it is an object of this invention to provide a pet grooming aid which dispenses treatment fluid from a reservoir in its handle.

It is another object of this invention to provide a pet grooming aid which delivers treatment fluid directly to a pet's skin through its fur.

It is another object of this invention to provide a pet grooming aid that doubles as a combing tool.

It is yet another object of this invention to provide a pet grooming aid which combines the steps of combing and treatment fluid dispensing.

The foregoing and other objects of this invention are achieved by providing a pet grooming aid comprising a flexible, elongate handle coupled to a head bearing rigid tines adapted to reach through a pet's fur to its skin. The handle includes a reservoir for treatment fluids, the reservoir being coupled through a gate valve to a manifold within the head that distributes the fluid to a tube within each tine. Squeezing the handle forces treatment fluid through the manifold and tines onto the pet's skin, while the gate valve prevents fluid flow when the handle is not squeezed. A recharge nozzle and cap at on the handle opposite the head allows filling the reservoir without spilling fluid out the tines, and seals the reservoir for use.

BRIEF DESCRIPTION OF THE DRAWINGS

The novel features believed characteristic of the present invention are set forth in appended claims. The invention itself, however, as well as a preferred mode of use and further objects and advantages thereof, will best be understood by reference to the following detailed description of an illustrative embodiment when read in conjunction with the accompanying drawings, wherein:

FIG. 1 depicts in perspective a preferred embodiment of the grooming aid of the present invention.

FIG. 2 shows the grooming aid of FIG. 1 in use on a pet.

FIG. 3 details how the grooming aid of FIG. 1 reaches through a pet's fur to dispense treatment fluid directly to the pet's skin.

FIG. 4 shows a right side elevational view of the grooming aid of FIG. 1.

FIG. 5 shows a front elevational view of the grooming aid of FIG. 1 as indicated in FIG. 4.

FIG. 6 shows a partial bottom plan view of the grooming aid of FIG. 1, as indicated in FIG. 4, and detailing the bottom of the head.

FIG. 7 is an exploded, longitudinal cross section of the grooming aid of FIG. 1, as indicated in FIG. 5.

FIG. 8 shows a partial rear elevational view, as indicated in FIG. 7, of the head of the grooming aid of FIG. 1.

FIG. 9 depicts an alternate embodiment of the present invention attached to a supplemental tank or bottle.

DETAILED DESCRIPTION OF A PREFERRED EMBODIMENT

With reference now to the figures, and in particular to FIGS. 1–4, grooming aid 10 comprises head 20 bearing tines 23 adapted for combing through fur 3 of pet 1. Being substantially rigid, tines 23 easily part fur 3 to reach directly to skin 5, a matter of significance elaborated upon below. Coupled to head 20 opposite tines 23, reservoir means 30 extends substantially coaxially with neck 14 along axis A to terminate in fill nozzle 37 sealed by cap 38. Head 20 preferably is made from any one of a number of liquid-impervious plastics, such as ABS (acrylonitrile-butadiene-styrene), injection molded or otherwise formed to include the features described herein, including optional splash guards 21 between tines 23 and neck 14.

As best seen in FIGS. 5 and 6, tines 23 preferably comprises a single row of five tines 23 arrayed across the bottom of head 20 substantially transverse axis A. One having ordinary skill in the art will recognize, however, that the number and distribution of tines 23 on the bottom of head 20 may vary, particularly as to the number of rows of tines 23 and the number of tines 23 in each row. Clearly, a plurality of tines 23 is needed, both to optimize distribution of fluid 7 evenly over pet 1's skin 5 and to comb and massage pet 1 during the treatment step.

Tines 23 maybe may be molded together with head 20, but they preferably are made separately from stainless steel and coupled to head 20 by known means. In either case, they are substantially rigid and include rounded tips 24 (FIGS. 7, 8) such that they do not flex significantly during combing but are unlikely to scratch skin 5. This permits them to penetrate even thick and rough fur 3 and reach skin 5. Tines 23 also are shown as being substantially half the vertical height of head 20 (e.g. as viewed in FIGS. 4, 7 and 8), but tines 23 also could vary in length dependent upon myriad factors such as the actual size of head 20, the size of pet 1 and the length and density of fur 3. All such variations in size and distribution of tines 23 are considered to be within the spirit and scope of the present invention.

As best seen in FIG. 7, head 20 further comprises interior manifold 33 which communicates with tubes 34 extending the length tines 23 to open at their tips 24 opposite splash guards 21. Fluid 7 thereby may pass from within manifold 33 through tubes 34 to skin 5 of pet 1. Fluid 7 thus may be deposited directly onto skin 5 without substantial wetting of the top surface 4 of fur 3. This has the advantage over prior art apparatus and techniques of keeping a dry layer of fur 3 between pet 1's mouth and its skin 5 where fluid 7 has been deposited (FIG. 3). In such case, fur 3 decreases but does not entirely eliminate the likelihood that pet 1 will ingest fluid 7 by licking or gnawing.

Continuing with FIG. 7, elongate reservoir means 30 is shown further to comprise interior reservoir 31 extending from fill nozzle 37 to coupling means 35 adjacent head 20. At head 20, reservoir 31 communicates with manifold 33 through valve 40 and neck 14. At its end opposite head 20, reservoir means 30 terminates in cap 38 which mates with nozzle 37 to close and seal reservoir 31. Reservoir means 30 preferably is made of resilient material such as rubber or polyethylene having sufficient elasticity that effective squeezing thereof propels fluid 7 into manifold 21 while having sufficient resiliency to return quickly to its undeformed shape. When released after squeezing, reservoir 31 draws air through tines 23 to replace expelled fluid 7.

Between reservoir 31 and manifold 21, gate valve 40 serves to trap unused fluid 7 within reservoir 31 until expelled into manifold 33. When user 2 squeezes reservoir 31, fluid 7 bears against resilient fingers 41, forcing them to part enough to let fluid 7 pass. Fingers 41 are stiff enough that the mere passive weight of fluid 7, without additional pressure from squeezing reservoir means 30, is insufficient to cause fingers 41 to part. This traps unused fluid within reservoir 31 and prevents it from moving into manifold 21 until user 2 wishes it to do so and squeezes reservoir means 30.

As depicted in FIGS. 1–7, reservoir means 30 preferably comprises elongate handle 11 adapted to fit conveniently within user 2's hand (FIG. 2), such that the combination of handle 11, head 20 and tines 23 comprise a hand-held comb for grooming pet 1 as well as for dispensing fluid 7. As such, preferably handle 11 comprises an elongate cylinder approximately one inch in diameter and six to eight inches long. In such dimensions, reservoir 31 has a capacity of two (2 oz.) ounces of fluid 7, plenty to treat a single pet 1 of moderate size. Ridges 12 or other friction means may be disposed along the longitudinal length of handle 11 for convenience in gripping handle 11.

In operation, user 2 fills reservoir 31 with treatment fluid 7 appropriate for the particular pet 1 and pest(s) (not shown) to be exterminated or repelled, or alternately with cleaning fluid such as shampoo or other liquids adapted for the purpose. Because of valve 40, reservoir 31 may be filled through fill nozzle 37 without fluid 7 running out through manifold 21 and tines 23. Once user 2 re-seals reservoir 31 with cap 38, he may lay aside grooming aid 10 until ready to use it. User 2 then acquires pet 1 and positions it for treatment and combing. If fluid treatment is contemplated, pet 1 may be positioned where any spillage of fluid 7 will not harm surroundings. Likewise, if cleaning fluid is to be used, having rinse water nearby may be desirable.

By applying pressure on the outside of reservoir means 30, user 2 increases pressure within reservoir 31 by reducing its volume, thereby parting fingers 41 and starting the flow of fluid 7. By regulating the squeezing pressure on reservoir means 30, user 2 can control the flow of fluid 7, increasing or decreasing the pressure for a corresponding increase or decrease of flow. Between combing strokes (discussed below), user 2 relaxes pressure on reservoir means 30, allowing air to be drawn back into reservoir 31 through tines 23. Grooming aid 10 works best when held as indicated in FIG. 2, with tines 23 pointed substantially downward and handle 11 angled upward as shown. This allows fluid 7 to pool in the lower end of reservoir 31, forcing air to the opposite, upper end near nozzle 37. Thus, squeezing pressure on reservoir means 30 continues to expel fluid into manifold 21 even though the volumetric ratio of air to fluid 7 within reservoir 31 increases.

Using moderately slow strokes, user 2 then proceeds to rake tines 23 through fur 3 of pet 1, proceeding from one end of pet 1 to the other, say from head to toe, and covering entirely pet 1's skin 5. As such strokes loosen excess hair or other debris within fur 3, user 2 may need to wipe such debris manually from tines 23 or fur 3 before continuing. Once pet 1 has been raked over its entire body by tines 23, the treatment process is completed. If fluid 7 is to be left on skin 5, nothing more need be done except to encourage pet 1 to run around, which activity will serve further to distribute fluid 7 on skin 5. If fluid 7 is a shampoo or other cleaning agent, flooding with water and further massaging and lathering may be required prior to rinsing pet 1.

For larger animals, or for continuous treatment of multiple pets 1, an alternate embodiment of the present invention appears in FIG. 9. Comprising head 50 bearing nozzle 57, the alternate embodiment has no handle 11 of its own, but instead replaces a storage cap (not shown) on bottle 53 of fluid treatment product. Nozzle 57 includes interior threads 59 adapted to mate properly with male threads 55 on bottle 53. This permits user 2 simply to remove the storage cap from bottle 53 and replace it with head 50. Assuming bottle 53 comprises a resilient material, it thus serves as reservoir means 30 without requiring any filling operation. In this case, and where bottle 53 is designed to sit upright on its bottom 54 as shown in FIG. 9, gate valve 40 could be omitted without fear of unintended leakage of fluid 7 through tines 23. Valve 40 preferably is retained within head 20, however, to assist regulation of flow of fluid 7 into manifold 33 during use.

The present invention, described in either its preferred or alternate embodiment, thus serves as means for simultaneously combing fur 3 while distributing fluid 7 directly to skin 5. It achieves the latter because tines 23 are substantially rigid and penetrate fur 3 without undue flexing, as would the bristles of many prior art alternatives. Further, because fluid 7 flows through internal tubes 24 of tines 23, rather than down the outside surface of tines 23 as with some prior art alternatives, fluid 7 does not contact top 4 of fur 3 or anywhere along the shafts of individual hairs of fur 3. Fluid 7 is delivered directly to skin 5 while top 4 of fur 3 remains dry.

While the invention has been particularly shown and described with reference to one or more embodiments, it will be understood by those skilled in the art that various changes in form and detail may be made therein without departing from the spirit and scope of the invention. For example, grooming aid 10 has been represented as primarily for pets, but it just as easily could be employed in veterinary settings for larger animals such as livestock. Also, though reservoir means 30 is depicted as attached directly to head 20, it could be a stand-alone tank (not shown) with a flexible feed tube (not shown) coupled to head 20, with a hand lever or foot pedal controlling pressure which feeds fluid 7 into manifold 31. Further, nozzle 57 has been discussed above as being distinct from nozzle 37 in that it is threaded for use on bottle 53. Nozzle 37 just as well could be so threaded, however, such that the preferred embodiment depicted in FIG. 1 also could be attached to bottle 53. This would provide for a more substantial reservoir means 30 that includes both reservoir 31 and bottle 53, yet, the preferred embodiment also could be used independently as discussed above. Also, though the reservoir means 30 has been discussed as resilient and the manner of propelling fluid 7 into manifold 31 described as squeezing handle 11, reservoir means 30 could be rigid and internal reservoir 31 could comprise a bladder (not shown) to be compressed either by a trigger (not shown) coupled to handle 11 or by pneumatic or hydraulic means (not shown).

We claim:

1. A grooming aid for dispensing animal treatment fluid, the grooming aid comprising
   a head having
      an interior manifold; and
      a neck forming an opening which communicates with the manifold;
   a plurality of tines coupled to the head opposite the neck and extending perpendicular thereto, each tine having
      a longitudinal tine axis;
      a proximate end adjacent the manifold;
      a tip end opposite the manifold
      a coaxial tube communicating with the manifold and extending to an outlet within the tip;
   storage means coupled to the neck and communicating with the manifold for storing and holding the treatment fluid;
   a nozzle coupled to the reservoir and communicating with the storage means; and
   a removable cap coupled to the nozzle and adapted to provide access to the storage means for filling it with treatment fluid.

2. The grooming aid according to claim 1 wherein the storage means further comprises
   an interior reservoir;
   propelling means for propelling fluid from the reservoir into the manifold; and
   a gate valve disposed at the neck opening between the manifold and the reservoir.

3. The grooming aid according to claim 2 wherein the propelling means comprises
   a resilient tube extending between the neck and the fill means, the tube forming the reservoir and adapted to be squeezed to expel fluid into the manifold.

4. The grooming aid according to claim 1 and further comprising
   a gate valve disposed in the neck opening between the manifold and the storage means.

5. The grooming aid according to claim 1 wherein the head further comprises
   splash guards disposed opposite the neck above the tines.

6. The grooming aid according to claim 5 wherein
   the splash guards include a part of the manifold; and
   at least one of the tines is coupled to the splash guard.

7. The grooming aid according to claim 1 wherein the storage means further comprises
   a resilient tube extending between the neck and the fill means, the tube forming a reservoir adapted to be squeezed to expel fluid into the manifold.

8. The grooming aid according to claim 7 wherein the tube further comprises
   an elongate body having a tube axis and forming a handle for the grooming aid.

9. The grooming aid according to claim 1 wherein the head further comprises
   a nozzle fitting disposed on the neck and having interior threads adapted to mate with exterior threads on a bottle container of treatment fluid, the bottle thereby adapted to serve as the storage means.

10. The grooming aid according to claim 1 wherein
    the tines extend from the head parallel to each other and in at least one row to form a comb for simultaneously combing the animal's fur while dispensing treatment fluid.

11. A grooming aid for dispensing treatment fluid onto an animal beneath its fur, the grooming aid comprising
    a head having
       an interior manifold;
       a neck surrounding an opening which communicates with the manifold; and
       splash guards disposed opposite the neck;
    a plurality of tines disposed beneath the splash guards, each tine having
       a proximate end adjacent the manifold and a distal end forming a tip;
       an interior tube extending the length of the tine, the tube communicating with the manifold at the proximate end and extending to a fluid dispensing opening in the tip; and
    a resilient handle coupled to the neck and having
       an interior reservoir communicating with the manifold through the neck;
       a nozzle coupled to the reservoir; and
       a removable cap adapted to mate with the nozzle to close the reservoir.

12. The grooming aid according to claim 11 wherein
    the tines extend from the head to form a comb having at least one row of tines.

13. The grooming aid according to claim 12 wherein
    the at least one row of tines is disposed transverse a longitudinal axis of the handle.

14. The grooming aid according to claim 12 wherein
    the tines are parallel to each other and the same length.

15. The grooming aid according to claim 12 wherein the tines
    are the same length and parallel to each other; and
    the at least one row of tines is disposed transverse a longitudinal axis of the handle.

16. The grooming aid according to claim 11 and further comprising
    a storage bottle for treatment fluid having a mouth; and
    a threaded fitting coupled to the head at the neck and adapted to mate with mouth wherein
    the storage bottle forms the handle and reservoir;
    the storage bottle mouth forms the nozzle; and
    the head forms the removable cap.

17. The grooming aid according to claim 11 and further comprising
    a tank adapted to contain treatment fluid;
    a hose coupled between the tank and the nozzle;
    pressure control means for pressurizing the tank; and pressure releasing means for releasing pressure in the tank to propel fluid through the hose and handle and into the manifold.

18. An improved method of dispensing treatment fluid onto a furry animal, the method comprising
providing a grooming aid having
a head;
a manifold within the head;
a neck formed on the head and having an opening which communicates with the manifold;
a plurality of tines coupled to the head opposite the neck, each tine having
a proximate end adjacent the manifold;
a tip end opposite the manifold; and
a coaxial tube communicating with the manifold and extending to an outlet within the tip;
a handle extending from the neck opposite the tines;
a treatment fluid reservoir within the handle and communicating with the manifold; and
a fill nozzle in the handle opposite the neck; then
filling the reservoir with treatment fluid; then
(1) positioning the head over a portion of the animal's fur and penetrating the fur with the tines to touch the tips to the animal's skin; then
(2) applying gentle squeezing pressure to the handle to expel treatment fluid into the manifold and out the tines while simultaneously moving the tines through the animal's fur with the tips gently contacting the animals skin; then
(3) releasing the squeezing pressure; then
(4) repeating steps (1) through (3) inclusive for successive alternate portions of the animal's fur until the entirety of the animal's skin has received treatment fluid.

19. An improved method of grooming a furry animal, the method comprising
providing a grooming aid having
a head;
a manifold within the head;
a neck formed on the head and having an opening which communicates with the manifold;
a plurality of tines coupled to the head opposite the neck, each tine having
a proximate end adjacent the manifold;
a tip end opposite the manifold; and
a coaxial tube communicating with the manifold and extending to an outlet within the tip;
a handle extending from the neck opposite the tines;
a treatment fluid reservoir within the handle and communicating with the manifold; and
a fill nozzle in the handle opposite the neck; then
filling the reservoir with treatment fluid; then
(1) positioning the head over a portion of the animal's fur and penetrating the fur with the tines to touch the tips to the animal's skin; then
(2) combing the animal's fur with the tines by manipulating the handle to move the tines through the animal's fur with the tips gently contacting the animals skin;
(3) at regular intervals during step (2)
(3a) applying gentle squeezing pressure to the handle to expel treatment fluid into the manifold and out the tines; and
(3b) releasing the squeezing pressure; then
(4) repeating steps (1) through (3b) inclusive for successive alternate portions of the animal's fur until the animal's fur has been groomed and its skin has received treatment fluid.

* * * * *